Nov. 10, 1931.   J. O. KER   1,831,569
ANIMAL MARKING TAG
Filed March 30, 1929
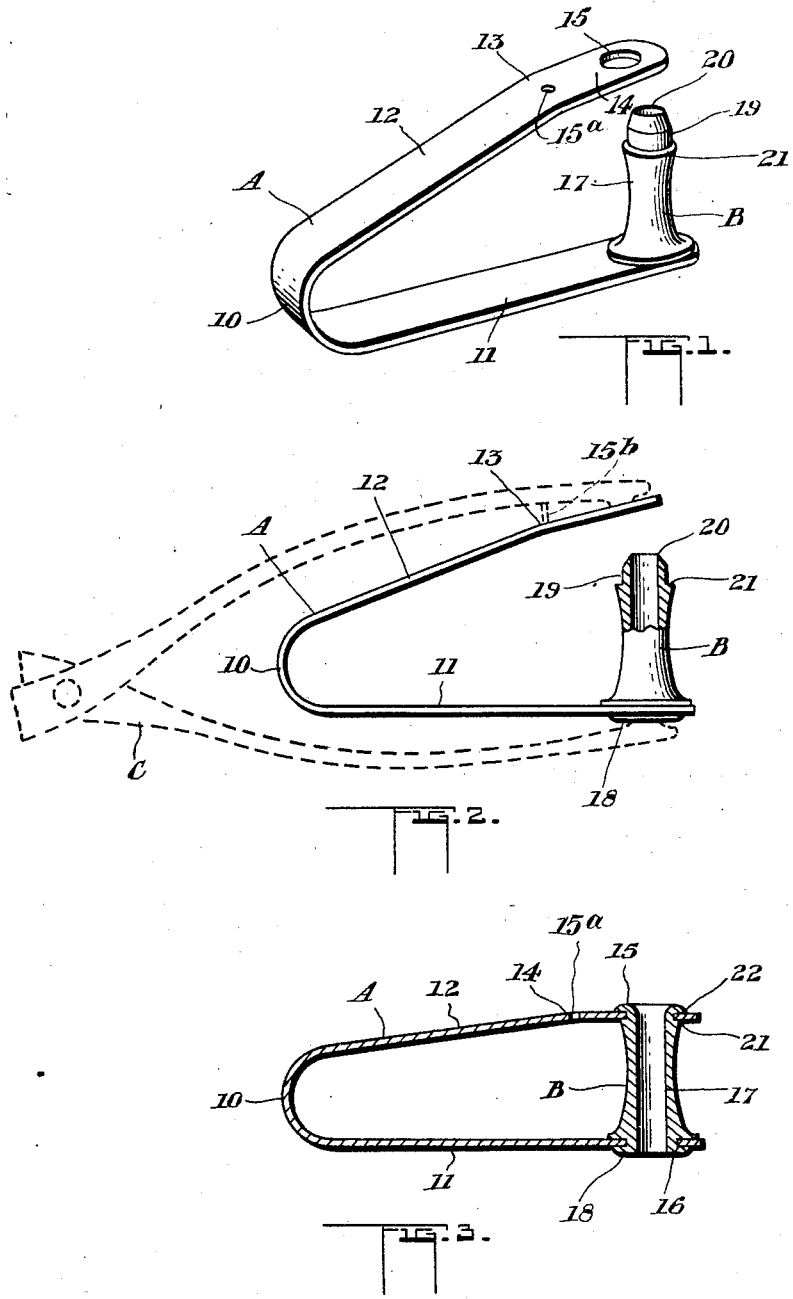
INVENTOR.
JOHN ORMOND KER.
BY W. T. Cuffe Quin
ATT'Y.

Patented Nov. 10, 1931

1,831,569

UNITED STATES PATENT OFFICE

JOHN ORMOND KER, OF OTTAWA, ONTARIO, CANADA

ANIMAL MARKING TAG

Application filed March 30, 1929. Serial No. 351,275.

This invention relates to animal marking tags and more particularly to ear tags which are used for marking and identifying cattle, sheep and other animals.

The principal objects of the invention are to provide an ear tag with which, once sealed, it is practically impossible to tamper without the fact being indicated.

A further object is to provide a tag of this description that once it is attached can be removed only by being broken and thus rendered valueless for use a second time.

A still further object is to provide an ear tag of light and strong construction that can be quickly and satisfactorily handled, that will be self-sealing and also pierce the ear of the animal in a clean and efficient manner.

It is well known that metallic tags usually made of aluminum are now in use for the purpose of identifying cattle, sheep and other animals and are formed with one end pointed and the other end provided with an eyelet through which the pointed end may be projected and clinched, the point being designed to pierce the ear before it engages with the eyelet. It is also known that ear tags are applied by means of tongues or pliers, whereby in one operation the ear of the animal is pierced and the pointed end of the tag clinched.

I am aware that the ideas of applying a metal band as above described, are not new. I am also fully aware from long practical experience that this and other forms of metal tags, heretofore and now in use, are by no means proof against their being tampered with and actually taken off, substituted or changed even after being clinched.

My invention therefore is largely identified with overcoming this particularly weak feature in identification tags. Whether it is due to weakness in existing tags or for other reasons, the fact remains that there does not appear at present to be an ear tag on the market which is proof against being tampered with or against becoming detached from the ears of animals when herded together and coming in contact with each other, or when the animals rub against obstacles. The serious feature, however, is that unscrupulous parties, for their own ends, may remove or change such tags without detection.

To overcome this, I provide a tag that has been found for all practical purposes, proof against tampering, once it is clinched or sealed in the animal's ear and which consists of a metallic strip adapted to be folded on itself having an opening or hole adjacent each end and formed flat at both ends. Co-operating with the strip is a specially constructed cutting and rivet member preferably of tubular formation adapted to be secured at one of its ends, in one end of the strip and formed at its opposite end with a shoulder and a reduced hollow sharpened extension to snugly engage with and protrude through the opening in the other end of the strip, to provide, when clinched, a sealing flange. The rivet member is of reduced diameter between its ends and the shoulder is adapted to co-act with the sharpened extension to clamp the last mentioned end of the strip when the extension is clinched against the strip.

It will be noted that the body of the sealing member for the free ends of the strip or band is concaved to provide an intermediate body portion of lesser diameter, so that the ear, when cut, will engage freely therewith without causing irritation, and thus assist in quickly and satisfactorily healing the wound in the ear.

Experiments have proved that, once the flange is formed on the upper face or one side of the strip by clinching the extension against the adjacent end of the strip it is impossible to remove the tag without breaking it. In this way and with this combination, a perfect self piercing and self sealing identification tag for live stock is provided, without the use of any special sealing elements.

In short, the combination of the perforated metallic strip with flat ends and a self piercing and double sealing rivet member produces a practical, efficient and economical result, that has not heretofore been attained by anyone, to my knowledge.

Referring now to the drawings in which like numerals of reference indicate corresponding parts in each figure.

Fig. 1 is an enlarged perspective view of the tag in open position.

Fig. 2 is a side view of the tag open with dotted lines showing the pliers or tool for clinching it.

Fig. 3 is a longitudinal section of the tag in closed position.

Referring now more particularly to the drawings, in which an example of the invention is disclosed, A indicates the usual metallic band or strip folded upon itself as at 10, to form the substantially flat arm 11 and the sloping arm 12, bent adjacent the end as at 13, to form a substantially flat portion 14 hereinafter more fully referred to. Adjacent the ends of the strip are the openings or holes 15 and 16. A hole 15a is provided, in portion 14, to receive a pin 15b of the clamping tongs which are shown in dotted lines.

In the form in which the tags are supplied to the users, the arm 11 has rigidly secured in the hole 16 a combined cutting and sealing rivet or link member B, which in combination with the construction of the strip, and more particularly the flat end portion 14, forms an essential and novel feature of the invention. This member B, here shown as of tubular construction as at 17, is spread as at 18, at its lower end, to be suitably secured in the hole 16 of the arm 11.

The member B may be of substantially the same material as the strip A, and is formed with an extension 19 tapered and terminating in a cutting edge 20 adapted to pierce the ear of an animal. Between the extension 19 and the body of the member B is formed a shoulder 21 adapted to engage with the underside of the flat portion 14 of the arm 12, when the extension 19 has pierced the animal's ear to engage with and protrude beyond the opening 15, so that when clinched, this extension will form, as disclosed in Fig. 3, an extended circumferential flange 22 on one side of the strip, which with the shoulder 21 will clamp the extremity of the arm 12, thus in one operation of the sealing tool, piercing the ear and sealing the tag.

It will be noted, from the foregoing, that the member B can be secured to the strip or separate therefrom as required. It will also be clear that the strip or band A is folded near the middle in the direction of its length being brought round in such a way that the flat apertured portion of one end will register with the flat apertured opposite end, whereby when the ends are sealed, by the member B, a sufficient space is provided to prevent undue pressure on, or irritation of the animal's ear. The body of the member B is preferably concaved.

In applying the tag, and as disclosed in Fig. 2, it is placed in the tongs or pliers C, of special construction and slipped over the side of the ear of the animal; the pliers are then compressed, the extension 19 of the member B pierces the ear of the animal and engages with the opening 15, is clinched and converted into the flange 22 on the upper side of the strip, while at the same time, the shoulder 21 is clamped against the underside of the strip.

While a specific embodiment of this invention is herein shown and described, it should be clearly understood that the detailed parts thereof may, or may not, appear in the preferred forms, and also that the preferred forms may be varied from time to time, depending upon the circumstances and conditions governing, and governed by, the development of this invention and the arts to which it is incident, so the interested inquirer is directed to interpret the scope of this invention from the claim, in which the spirit is set forth.

I claim:

A marking tag for animals and the like comprising a pliable strip having an opening in one of its extremities and a rivet secured at one of its ends to the opposite extremity of the strip and provided at its opposite end with a shoulder and a reduced hollow sharpened extension snugly receivable in said opening, the rivet being of reduced diameter between its ends and the shoulder being arranged to co-act with the sharpened extension of the rivet to clamp the first mentioned extremity, when the extension is crushed against the strip.

In witness whereof I have hereunto set my hand.

JOHN ORMOND KER.